Patented July 6, 1943

2,323,483

UNITED STATES PATENT OFFICE 2,323,483

EXTRACTION AND RECOVERY OF PECTIN

Philip B. Myers and Alvin H. Rouse, McAllen, Tex., assignors to Sardik, Inc., New York, N. Y., a corporation of New Jersey No Drawing. Application November 3, 1941,
Serial No. 417,606

16 Claims. (Cl. 260—210)

This invention relates to the extraction, recovery and purification of pectin, and is concerned more particularly with the extraction of pectin, or a pectin product, from a pectic material by means of an ion exchange product.

The present commercial sources of pectin are apple pomace, which is a pulpy residue from cider mills, and the albedo of citrus fruits such as grapefruit, lemons and oranges. The term "albedo" is used in this art to include both the rind and the rag of the citrus fruits. Most of the pectin in such pectic raw material is present in the form of the insoluble complex known as protopectin, which is believed by many authorities to be a combination of pectin and cellulose. In addition, such pectic raw material contains some of the pectin in free form along with other soluble and insoluble constituents such as cellulose, glucosides, oils, sugars, acids, salts and proteins.

Heretofore, it has always been believed that it was necessary to use an acid hydrolysis in order to extract the pectin satisfactorily from the protopectin complex. Such a process has to be carefully controlled, but even under the most favorable circumstances some of the pectin is usually hydrolyzed to some extent resulting in a lowering of the grade of pectin, or in a sacrifice of yield if the grade is maintained at a high standard. For example, a high yield of relatively low grade pectin is obtained at boiling temperatures using the customary hydrochloric acid process if the pH is maintained at approximately 1.75, whereas the highest grade of pectin is obtained, but with lower yields, using a somewhat higher pH of around 2.60. As will be understood by those skilled in the art, the grade of pectin is the number of pounds of sugar that one pound of pectin will jell under standard conditions. The largest number of jelly units (grade multiplied by percentage yields) has been obtained in the hydrochloric acid process by the use of a pH in between these two extremes, viz., about 2.4.

Pectin which has been liberated from the raw material by the acid hydrolysis process is associated with a number of impurities, both organic and inorganic, from which it has to be separated in order to obtain a pure product. This purification has been accomplished in the past in a number of different ways. For example, the pectin has been precipitated from the liquid extract by means of alcohol, but such a process is expensive because of the large quantities of alcohol required and the necessity for vacuum concentration of the extract before the precipitation. In addition, this process does not separate the pectin from some of the constituents such as proteins, which may be associated with it in the raw material and which are carried through this purification treatment along with pectin.

Another purification treatment that has been used has involved the use of aluminum hydroxide to precipitate the pectin, according to Patent No. 1,497,884. The formation of other metallic pectinates has also been used as a means of purifying the pectin, including the precipitation of the pectin as calcium pectinate (Patent No. 2,132,577), as a nickel pectinate (Patent No. 2,163,621), and as a copper pectinate (Patent No. 2,163,620). These insoluble, more or less gelatinous metal-pectin complexes, which we shall call metal pectinates, have to be at least partially dehydrated before they are leached with acidified alcohol, in order to produce a high grade of product.

All of the foregoing processes are expensive by reason of the necessity of using alcohol. For example, when vacuum concentration of the extract is employed, it is necessary to use large quantities of alcohol in the precipitation and purification of the pectin in the concentrate. Or, when the pectin is precipitated with a metal, it is necessary to use large quantities of acidified alcohol to separate the metal from the metal pectinate.

One object of this invention is to the provision of an economical and simplified process of extracting high yields of good grade pectin from pectic raw material by the use of a cation exchange product.

Another object of this invention is the provision of a process using a cation exchange material to separate pectin from an insoluble metal pectinate.

A further object of the invention is the purification of pectin extracts to remove impurities therefrom by means of cation and/or anion exchange materials.

Other and further objects of our invention will be more particularly pointed out below and will be apparent from the following description of various embodiments of our invention given herein by way of example.

We have found that excellent yields of high grade pectin can be liberated directly from pectic raw material such as apple pomace or albedo by a treatment with a hydrogen zeolite. Such a treatment does not require the addition of hydrochloric or other free acid, and can be carried out at a high enough pH to produce the best grade of pectin. Any suitable hydrogen zeolite can be used for this purpose although, for economical reasons, we prefer to employ an organic cation exchange product that can be regenerated repeatedly with acid, so that the ion exchange product can be used over and over again in the process. Suitable organic cation exchange materials for this purpose are described in Liebknecht Patent #2,191,060 and Smit Patent #2,191,063. Various ion exchanging resins or other zeolitic materials that can be regenerated with acid, however, may be used for this purpose.

It has always been considered necessary, heretofore, to provide a very high hydrogen ion concentration in order to liberate high yields of pectin from protopectin. We have found, however, that equally high, if not higher, yields can be obtained by our process at lower hydrogen ion concentrations. In fact, we can obtain as high a yield of pectin from protopectin materials at a pH of 2.75 as are obtained with hydrochloric acid at a ph of 1.75. And these high yields are obtained by our process without the lowering of the grade of pectin that occurs at a pH of 1.75.

Apparently, our process is more effective with respect to yield at higher pH's because of the removal of metallic constituents that occur naturally in apple pomace and albedo and that cause abnormally high viscosities in pectin dispersions. Whereas the lower pH's are necessary with hydrochloric acid extraction to reduce the high viscosity of the liberated pectin caused by the presence of metallic constituents, this difficulty and the use of lowered pH's are avoided in our process because the metallic constituents are taken up by the zeolitic material simultaneously with the liberation of pectin.

The treatment of the raw material with a hydrogen zeolite can be carried out at a pH of 2.5 to 2.8, which is produced by the liberation of exchangeable hydrogen ions from the zeolitic material. At such a high pH, a high yield of a high grade of pectin is obtained, thus producing a much greater number of jelly units with a single extraction than is obtained by the use of hydrochloric acid.

Of course, if the pectic raw material treated with the hydrogen zeolite product contains too high a proportion of metallic constituents, a correspondingly higher proportion of hydrogen ions will be liberated from the zeolitic material and the pH of the mixture may drop to a point where it injures the grade of the pectin liberated. This difficulty is easily avoided, however, by simply washing the pectic raw material thoroughly with water to remove the bulk of the water soluble constituents and any excess of metallic salts before treatment with the hydrogen zeolite. This preliminary washing, therefore, accomplishes two results, (1) the elimination of water soluble materials such as acids, salts, sugars, etc. present in the pectic raw material, and (2) the elimination of any excess of metallic constituents so that the pH of the mixture is not unduly lowered during the reaction of the pectic raw material with the hydrogen zeolite. On the other hand, some free pectin in the raw material may be washed out by this preliminary treatment, although this loss is ordinarily more than justified by the high yield obtained from the remaining protopectin.

This procedure also eliminates automatically any substantial quantity of lead that may be present in the pectic raw material by reason of sprays that have been used on the fruit while it is growing. Lead spray residues in the past have served to complicate the process of purifying pectin to produce a commercial acceptable purity.

The process may be readily carried out by grinding or otherwise reducing the pectic raw material to a pulp, if it is not already in a finely divided condition, and thoroughly leaching it with water to remove soluble constituents. If the albedo or apple pomace is fresh, we prefer to heat it first in water at 90° C. for about five minutes in order to inactivate the enzymes. The raw material may then be washed free from soluble constituents. The washed raw material is agitated with water and a suitable quantity of finely divided hydrogen zeolite at a temperature of from about 60 to 100° C. The amount of water used should be sufficient to provide a relatively dilute solution of pectin extract, for example, around 0.5%, and the relative proportions of pectic raw material and hydrogen zeolite will vary in accordance with the composition of the pectic raw material, i. e. its content of metallic constituents and protopectin, and also with the ion exchange capacity of the particular hydrogen zeolite used. The quantity of hydrogen zeolite should be somewhat in excess of the quantity theoretically required to take up all of the metallic constituents in the raw material. Agitation of the pectic raw material, water and hydrogen zeolite may be carried out, for example, at 90° C. for one hour, or when higher temperatures such as 100° C. are used, the agitation period may be reduced to say thirty minutes.

While we prefer to use conditions that produce a higher pH in order to obtain a higher grade of pectin, it will be obvious to those skilled in the art that if a slow-set pectin is desired, which is obtained by a partial de-methylation at a low pH, this may be accomplished by simply using a smaller quantity of water with the unleached raw material and the hydrogen zeolite. Sufficient acid will then be generated to lower the pH to a point where de-methylation occurs without the necessity for adding any free acid. On the other hand, of course, some free acid may be added if desired.

After the extraction is completed, the mixture of raw material, pectin extract and zeolite is preferably cooled rapidly and treated to separate the ion exchange material and the pulp from the extract. This may readily be accomplished by centrifuging. If the mixture is centrifuged at say 60° C., first with a rapid rate of flow and then at a slow rate, the suspended solids are readily removed, the zeolite being removed during the first part of the centrifuging while the slow centrifuging serves to remove the bulk of the pulp.

The zeolitic material may then be readily washed free from the pulp and regenerated with a suitable acid solution, such as sulfuric or hydrochloric acid and washed, as will be understood by those skilled in the art, after which it will be in condition for use in the treatment of another batch of pectic raw material. Instead of centrifuging the extracted mixture, the ion exchange material and pulp may be separated by various other means such as pressing in a hydraulic press.

The liquid extract may be treated with activated carbon, clarified and concentrated directly, and the pectin dried on a rotary drum, for example, according to the process described in Patent No. 1,973,613. If the raw material contains much starch, however, it may be desirable to treat the liquid extract before clarification with a diastatic enzyme.

The ash of the product thus obtained will usually be about 1%, or less, of the weight of the pectin, and the extract, at a concentration of about 0.5% pectin, will have a pH of from 2.8 to 2.5 when the free acid is within the range 0 to 100 parts per million, the only free acid being that which is generated by the ion exchange reaction between the hydrogen zeolite and the small amounts of soluble salts associated with the raw material.

If desired, this extract may be further purified to lower the ash content by percolating it through an additional bed of hydrogen zeolite, or a lower ash product may be obtained initially by using a somewhat larger excess of hydrogen zeolite during the original separation and extraction treatment of the raw material.

While drying of the pectin concentrate on a drum has been mentioned, it will be apparent that other known processes may be used for recovering the pectin from the purified extract, or converting it to any suitable compound. For example, it may be precipitated from the concentrate with alcohol, although the use of alcohol is not necessary for further purification.

A particular advantage of this process is that the extract can be concentrated in a vacuum evaporator to a higher degree than has been commercially practical heretofore and with less loss in the grade of the product by reason of the freedom of the extract from metallic cations that cause abnormally high viscosities. Also, the neutralization of acid may be done away with, which greatly assists in recovering a pure product since it avoids the addition of impurities which must be removed at some later stage.

The following table shows a comparison between results obtained according to this invention and results obtained by the ordinary hydrochloric acid hydrolysis process. Grapefruit albedo was used as the raw material in each case and the yields are based on the weight of leached dry raw material.

|  | HCl | Extraction | H-zeolite | Extraction |
| --- | --- | --- | --- | --- |
| Temp. of extraction °C... | 90 | 100 | 90 | 100 |
| Time of extraction minutes.. | 30 | 30 | 60 | 30 |
| pH of extract | 2.25 | 2.30 | 2.75 | 2.70 |
| Yield of pectin per cent | 27.30 | 30.23 | 34.86 | 34.26 |
| Grade of pectin | 213.8 | 175.7 | 228.5 | 210.2 |
| Jelly units | 58.37 | 53.11 | 79.66 | 72.01 |

The higher grades along with higher yields obtained by our process as shown in this table are particularly outstanding advantages of this invention. In fact, 40% yields of 240 grade pectin have been obtained by the process of this invention.

Another embodiment of our invention is based upon the use of a zeolitic material to recover pectin from an insoluble metal pectinate, such as those of aluminum, calcium, copper and nickel that are mentioned above. The preparation of such metal pectinates has been practiced as a means of obtaining pectin from extracts without the necessity of a number of vacuum evaporations.

The metallic pectinate may be precipitated in the usual manner from either an acid hydrolysis extract of pectic raw material or from an extract obtained directly by the hydrogen zeolite treatment of pectic raw material as described above, or it may be derived from some other process of extraction.

These metal pectinates are insoluble in water but have a very gelatinous character, and consequently retain naturally rather large quantities of water. We have found that such a metal pectinate can be reacted directly with a zeolitic material to liberate the pectin in soluble form. In the customary treatment of a metal pectinate to recover pectin, it is necessary to dry the precipitated metal pectinate under a vacuum before treating it with acidified alcohol. If the wet metal pectinate is leached directly with acidified alcohol, an enormous reduction in the grade of resulting pectin occurs. We prefer to use for the zeolitic treatment an organic zeolite containing exchangeable hydrogen of the character described above. The reaction may be carried out by simply mixing the wet metal pectinate with finely divided hydrogen zeolite until the mixture liquefies to produce a solution of the liberated high grade pectin. On the other hand, if desired, the metal pectinate may be treated first with a small amount of acid to start the liquefying process, and this material may then be flowed through a bed of a hydrogen zeolite wherein the liquefying process liberating the pectin is completed.

For example, a wet copper pectinate containing 97% water wherein the copper pectinate contains about 4% of copper on a dry basis, may be mixed with a sufficient quantity of a hydrogen zeolite to take up all of the metal in the metal pectinate. The exact proportion of hydrogen zeolite should be slightly in excess of the theoretical amount required, and will, of course, depend upon the ion exchange capacity of the zeolitic material and the actual amount of metal in the metal pectinate. After agitation of such a mixture in an ordinary mixing apparatus for about thirty minutes, the pectin will be found to be liberated in solution and the agitation may be stopped. This solution may be decanted to separate it from the zeolitic material, which now is combined with the metal, and the pectin may be recovered in any suitable manner from the decanted liquid. It has been found, for example, that such a pectin may be obtained from a copper pectinate with an ash of only 0.17% (mostly silica) and a grade of 223, in spite of the fact that the acidified alcohol treatment of a wet copper pectinate usually reduces the grade to 50 to 70.

Here again, it is desirable to wash the insoluble metal pectinate with water to remove any soluble salts or other constituents before mixing it with the hydrogen zeolite. By this procedure, it is possible to produce a pectin free from these impurities, and in concentrations up to 4 to 5%. The separated zeolitic material combined with the metal may, of course, be washed, regenerated with acid and again washed to place it in a condition suitable for re-use. This treatment is preferably carried out in the presence of sufficient added water to produce a final pectin solution of about 3 to 4%, and the mixing is advantageously carried out at an elevated temperature. Temperatures up to 60° may be used, a temperature of 40° C. being particularly satisfactory for most purposes. If the temperature is increased too much above 60° C., the resulting pectin is found to have a somewhat lower grade.

Another mode of treating a metal pectinate with a hydrogen zeolite is to line a centrifuge with a layer of hydrogen zeolite. A layer of the insoluble metal pectinates is then formed over the hydrogen zeolite layer and a second layer of the zeolitic material placed over the metal pectinate layer. When such a mixture is then centrifuged, the centrifugal force produces mixing of the metal pectinate and the innermost layer of hydrogen zeolite. The pectin solution that forms is then filtered through the outermost layer of hydrogen zeolite and issues from the centrifuge in a continuous, viscous stream. The remaining material in the centrifuge may be sprayed with water to remove any additional pectin adhering thereto.

In this operation also, the zeolitic material that remains in the centrifuge may be regenerated with sulfuric, hydrochloric or other suitable acid and washed to place it in a condition ready for re-use. If it is practical, of course, the metals that are washed out of the zeolitic material when it is regenerated with acid, may be recovered from the regeneration effluent, and used for the precipitation of additional quantities of metal pectinate, or for other purposes. In many instances, however, this metal recovery may not be practical.

The pectin solution obtained from the treatment of a metal pectinate with the zeolitic material either by using a mixing tank, a centrifuge or some other device, may still contain small amounts of impurities, or may even contain minute quantities of unconverted metal pectinate. In addition, this solution, when purified by the use of a hydrogen zeolite, may contain some free acid, especially if an acid has been used to partially liquefy the metal pectinate before treatment with the hydrogen zeolite. It may be desirable, therefore, although it is not essential, to purify this pectin solution further by removing the free acid by means of a suitable anion exchange or anion absorbing product. Various products of this nature are on the market and one which is satisfactory is described in United States Patent #2,226,134.

After percolating the pectin concentrate through a bed of such an anion exchange material, the concentrated solution may then be passed through a bed of hydrogen zeolite to remove the last traces of metallic impurities. The use of the anion exchanger first is desirable in order to eliminate the free acid from the solution before it is passed through the bed of hydrogen zeolite. The pure pectin solution thus obtained may be packaged directly, or the pectin therein may be recovered by any convenient process, such as drying on a revolving drum, or precipitating with alcohol.

The anion exchange product can, of course, be regenerated, as will be understood by those skilled in the art, with a solution of a suitable base.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:
1. A process of recovering pectin comprising reacting a pectin complex in an aqueous medium with an ion exchange material.
2. A process of recovering pectin comprising reacting a pectin complex in an aqueous medium with a hydrogen zeolite.
3. A process of separating pectin from a pectic material containing metallic constituents comprising reacting such material with a hydrogen exchanging organic zeolite to combine with the metallic constituents and liberate pectin.
4. A process of separating pectin from a metal pectinate comprising reacting such a pectinate in the presence of water with a zeolitic material that combines with said metal.
5. A process of separating pectin from a metal pectinate comprising reacting such a pectinate in an aqueous medium with a hydrogen zeolite.
6. A cyclic process of purifying a pectin extract comprising bringing such an extract into intimate contact with a hydrogen exchanging zeolitic material to remove metallic constituents therefrom, thereafter regenerating said zeolitic material with an acid, and treating further quantities of extract with the regenerated material.
7. A process of recovering pectin from material containing protopectin comprising reacting such material in an aqueous medium with a hydrogen zeolite.
8. A process of recovering pectin from material containing protopectin comprising washing such material to remove the bulk of soluble constituents therefrom, and reacting the washed material in an aqueous medium with a hydrogen zeolite.
9. A process of recovering pectin from a metallic pectinate comprising washing the pectinate to remove the bulk of soluble matter, and reacting the washed pectinate in an aqueous medium with a hydrogen zeolite.
10. A process of purifying a pectin extract comprising precipitating the pectin as an insoluble metallic pectinate, separating the precipitate from the extract, reacting the precipitate by agitating it with finely divided hydrogen zeolite, and separating the zeolite from the resulting liquid.
11. A process of recovering pectin from a wet metallic pectinate comprising adding free acid thereto to partially liquefy the mass, and passing the acid treated material through a bed of a hydrogen zeolite to complete the liberation of pectin and remove metallic constituents from the resulting liquid.
12. A process of recovering pectin from citrus fruit albedo comprising agitating the albedo in water with finely divided hydrogen zeolite at a temperature of at least about 60° C., filtering the mixture to separate the liquid extract, and recovering the zeolite from the residue for reuse.
13. A process of recovering pectin from apple pomace comprising agitating the pomace in water with finely divided hydrogen zeolite at a temperature at least about 60° C., filtering the mixture to separate the liquid extract, and recovering the zeolite from the residue for re-use.
14. A process of purifying a solution of pectin containing inorganic impurities comprising bringing said solution into intimate contact with a hydrogen zeolite and an anion exchange material.
15. A process of purifying a solution of pectin containing inorganic impurities including free acid comprising bringing said solution into contact with an anion exchange material, and thereafter bringing the solution into contact with a hydrogen zeolite.
16. A process of purifying a solution of pectin containing free acid comprising bringing the solution into intimate contact with an anion exchange material.

PHILIP B. MYERS.
ALVIN H. ROUSE.